L. COATALEN.
PISTON FOR INTERNAL COMBUSTION ENGINES.
APPLICATION FILED SEPT. 6, 1916.
1,240,421.
Patented Sept. 18, 1917.
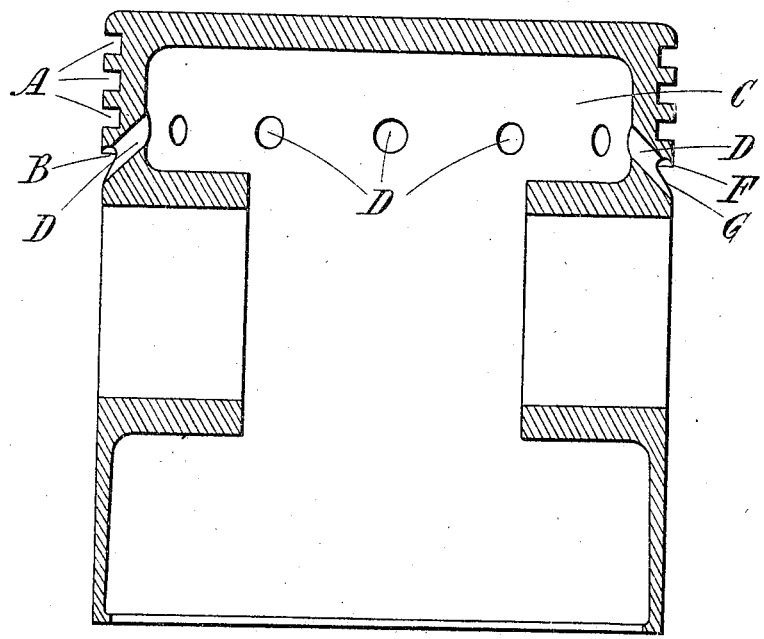
Inventor:
Louis Coatalen,
by Spear, Middleton, Donaldson & Spear
Atty's.

UNITED STATES PATENT OFFICE.

LOUIS COATALEN, OF WOLVERHAMPTON, ENGLAND, ASSIGNOR OF ONE-HALF TO SUNBEAM MOTOR CAR COMPANY LIMITED, OF WOLVERHAMPTON, ENGLAND.

PISTON FOR INTERNAL-COMBUSTION ENGINES.

1,240,421.

Specification of Letters Patent. Patented Sept. 18, 1917.

Application filed September 6, 1916. Serial No. 118,782.

*To all whom it may concern:*

Be it known that I, LOUIS COATALEN, a subject of the King of Great Britain, and resident of Wolverhampton, in the county of Stafford, England, have invented certain new and useful Improvements in Pistons for Internal-Combustion Engines, of which the following is a specification.

This invention has for its object to provide improved means applicable to the pistons of internal combustion engines for preventing oil passing the piston rings and entering the combustion chamber.

It is common practice to provide one or more grooves in the skirt of the piston in which the oil collects, and from which it passes through into the interior of the piston by means of a number of small holes. It is the object of the present invention to improve the efficiency of arrangements of this kind, and if necessary to improve the lubrication of the lower part of the piston.

The accompanying drawing is a central vertical section showing one form of piston constructed in accordance with this invention.

Immediately beneath the grooves A provided for the reception of the piston rings is a special oil-catching groove B which passes the whole way around the piston and communicates with the interior C of the piston through a number of holes D which are upwardly inclined and lead from the inner side of the groove. In section, the groove B is roughly one-half cordiform in shape with the apex thereof at the lowest point.

With this arrangement it will be clear that as the piston descends the edge F exerts a scraping action assisting in the collection of oil in the groove. This oil, owing to its inertia, passes through the holes D into the interior of the piston and does not remain on the cylinder walls. As the piston rises any oil remaining in the groove is encouraged to descend owing to the shape of the wall G of the groove.

It is preferred that the groove B be located immediately beneath the grooves A so as to divert the oil before it reaches the piston rings and to allow it first of all to lubricate the skirt of the piston. Obviously there may be more than one groove such as B with passages D.

What I claim as my invention and desire to secure by Letters Patent is:—

In a piston for an internal combustion engine, the combination of a skirt, having grooves therein, an oil-catching groove below said piston ring grooves which in section is one-half cordiform in shape with the apex thereof at the lowest point, and upwardly inclined passages leading from the inner side of said groove to the interior of the piston, substantially as set forth.

In testimony whereof I have signed my name to this specification in the presence of two subscribing witnesses.

LOUIS COATALEN.

Witnesses:
 JOHN MARSTON,
 W. W. ILIFF.